United States Patent [19]

Carlson et al.

[11] Patent Number: 5,244,739
[45] Date of Patent: Sep. 14, 1993

[54] MAGNETIC RECORDING MEDIA COMPRISING A CURED DISPERSION COATING OF A MAGNETIZABLE PIGMENT AND POLYURETHANE POLYMER CONTAINING A VINYL POLYMERIC SEGMENT PENDANT FROM THE POLYURETHANE BACKBONE

[75] Inventors: James G. Carlson, Maplewood; Jeffrey T. Anderson, St. Paul, both of Minn.

[73] Assignee: Minnesota Mining and Manufacturing Company, St. Paul, Minn.

[21] Appl. No.: 852,937

[22] Filed: Mar. 13, 1992

Related U.S. Application Data

[63] Continuation of Ser. No. 543,343, Jun. 25, 1990, abandoned.

[51] Int. Cl.$^5$ ................................................. G11B 5/00
[52] U.S. Cl. .......................... 428/425.9; 428/694; 428/900; 252/62.54
[58] Field of Search ................... 428/694, 900, 425.9; 252/62.54

[56] References Cited

U.S. PATENT DOCUMENTS

| | | | |
|---|---|---|---|
| 3,219,635 | 11/1965 | Emrich | 260/77.5 |
| 3,989,768 | 11/1976 | Milkovich et al. | 260/859 |
| 4,521,546 | 6/1985 | O'Connor et al. | 521/137 |
| 4,647,506 | 3/1987 | Colon et al. | 428/413 |
| 4,664,964 | 5/1987 | Okita et al. | 428/143 |
| 4,672,095 | 6/1987 | Ito et al. | 525/455 |
| 4,683,280 | 7/1987 | Ukachi et al. | 528/71 |
| 5,006,406 | 4/1991 | Kovacs et al. | 428/323 |
| 5,118,580 | 6/1992 | Ohkubo | 428/425.9 |
| 5,134,035 | 7/1992 | Kumar et al. | 428/425.9 |

FOREIGN PATENT DOCUMENTS

| | | |
|---|---|---|
| 0193084 | 9/1986 | European Pat. Off. |
| 0377297 | 7/1990 | European Pat. Off. |
| 3-34118 | 6/1989 | Japan |

OTHER PUBLICATIONS

Annex to the European Search Report on European Patent Application No. EP 91 30 5590.

*Primary Examiner*—Paul J. Thibodeau
*Assistant Examiner*—Stevan A. Resan
*Attorney, Agent, or Firm*—Gary L. Griswold; Walter N. Kirn; Janice L. Dowdall

[57] ABSTRACT

The invention relates to vinyl sulfonated and non-sulfonated hydroxy functional polyurethane copolymers prepared from macromonomer diols and their use in magnetic recording media. The sulfonated hydroxy functional copolymer comprises: a polyurethane backbone; at least one $SO_3M$ group pendant from the polyurethane backbone, wherein the polyurethane backbone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof; at least two crosslinkable hydroxy groups pendant from the polyurethane backbone, wherein the polyurethane backbone has a hydroxy equivalent weight of from about 500 to about 50,000; and at least one vinyl polymeric segment pendant from the polyurethane backbone.

6 Claims, No Drawings

MAGNETIC RECORDING MEDIA COMPRISING A CURED DISPERSION COATING OF A MAGNETIZABLE PIGMENT AND POLYURETHANE POLYMER CONTAINING A VINYL POLYMERIC SEGMENT PENDANT FROM THE POLYURETHANE BACKBONE

This is a continuation of application Ser. No. 07/543,343 filed Jun. 25, 1990, now abandoned.

FIELD OF THE INVENTION

This invention relates to vinyl-sulfonated and non-sulfonated hydroxy functional polurethane copolymers prepared from macromonomers. The invention also relates to the use of such copolymers in magnetic recording media.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable. There are a number of reasons for using as little dispersant as possible. Costs, for example, can be reduced by using less dispersant. Additionally, binder dispersions can be more readily and reproducibly prepared when less dispersant is used. Further, excess dispersant may have a tendency to bloom from a cured binder dispersion over time, leading to contamination of a recording head or the like, or causing a change in the physical or chemical characteristics of the media.

Another problem in the art is that the viscosity of a binder dispersion generally increases with higher loading of magnetizable pigment. If the dispersion is too viscous, it can be difficult to apply to the substrate, and good magnetic orientation of the pigment, i.e., a squareness ratio of 0.75 or more, can be hard to obtain. The squareness ratio (Br/Bm), which is the ratio of the remnant saturation induction, or residual magnetization (Br), to the saturation induction, or saturation magnetization (Bm), refers to the effectiveness of the orientation of the magnetic particles. For randomly-oriented particles, the squareness ratio is 0.5 and for ideally and perfectly oriented particles, the ratio is equal to 1.0. Values for the squareness ratio, of media exhibiting good performance, normally fall around 0.75 to 0.85, with higher values being better.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant is needed for dispersion of magnetizable pigment in the binder.

Copending U.S. application Ser. No. 07/429,720, filed Oct. 31, 1989 now U.S. Pat. No. 5,071,578 which is a continuation-in-part of U.S. application Ser. No. 07/295,046, filed Jan. 6, 1989 now abandoned (assigned to the assignee of the present case) discloses a curable polymer having internal dispersants which comprises a sulfonated, hydroxy-functional polyurethane (SHPU) resin. The SHPU resin can be used as part of a binder layer in magnetic recording media. The application discloses the excellent dispersion of magnetizable pigment within the SHPU resin and the ease of application of the dispersion onto a suitable substrate.

However, there are certain types of media constructions where high glass transition temperature (Tg) and abrasion resistance in the uncured state, and high final coating modulus are both desirable and necessary, for example, where stiffer tapes are needed for better handling in the recording and playback machine, or where manufacturing methods dictate the necessity of having high initial strength coatings that are resistant to damage during manufacture or processing.

In order to increase the durability, running properties, and reliability of the magnetic recording media, attempts have been made to add a hard material to the pigment-containing binder.

U.S. application Ser. No. 07/315,304 now abandoned (assigned to the assignee of the present case), incorporated by reference herein, discloses a blend of SHPU and another polymer usually called a "hard resin" which is used to attain the desired high $T_g$ for optimum binder performance in certain applications. The "hard resin" disclosed in 07/315,304 is a cross-linkable hydroxy-functional vinyl chloride having incorporated therein —$SO_3M$ groups wherein M represents $H^+$ or a metal cation. Although polymer blends of the type disclosed in 07/315,304 are very useful the dispersing character of the binder system can sometimes diminish. In addition, only a few types of hard resins have been found to be functional because of a general lack of polymer/polymer compatibility. For example, hard resins based upon acrylic monomers have not usually been found to be usefully compatible with the preferred types of polyurethane binder resins.

In order to optimize binder performance, single polymer systems have been developed in which a "hard resin" is grafted onto a polyurethane having hydroxy and sulfonate groups rather then blended therewith.

Copending concurrently filed U.S. patent application Anderson et al., Ser. No. 07/543,230 now U.S. Pat. No. 5,134,035 (assigned to the assignee of the present case) describes sulfonated and non-sulfonated, hydroxy and thiol functional polyurethanes and graft copolymers made therewith prepared via free radical polymerization of vinyl monomer in the presence of sulfonated and non-sulfonated, hydroxy, and thiol functional polyurethanes, respectively. Although the method has a number of distinct advantages including the ability to use a broad range of vinyl monomers the method does not provide for the use of anionically polymerized vinyl monomer segments and is limited to an extent regarding synthetic control.

Copending concurrently filed U.S. patent application Kumar et al., Ser. No. 07/543,361, now U.S. Pat. No. 5,118,580 (assigned to the assignee of the present case) discloses dithiocarbamate modified sulfonated and non-sulfonated hydroxy-functional macroiniferter compounds and vinyl/sulfonated and non-sulfonated hydroxy functional polyurethane (vinyl/SHPU and vinyl/HPU) graft and block copolymers made therewith using photoiniferter technology. The method generates quality material which performs very well when tested in magnetic recording applications. However, due to the photopolymerization required, the acquisition of special manufacturing equipment is necessary.

Thus, somewhat similar copolymers can be prepared via the above two methods although each method and resultant copolymer has its own distinct advantages. Although the above two methods are extremely useful a need exists for a method which offers simplicity, practicality, superior synthetic control, and economic efficiency regardless of the range of possible compositions. A need thus exists for a single polymer magnetic binder system which does not need to be blended with a hard resin which possesses a high $T_g$, good mechanical properties, disperses pigment well, and which is capable of being crosslinked by isocyanate curatives. We have discovered such a copolymer and method.

BRIEF DESCRIPTION OF THE INVENTION

A first aspect of the present invention relates to the novel vinyl/sulfonated hydroxy functional polyurethane block and graft copolymers prepared using macromonomer diols. The novel tailor-made graft and block copolymers can be used for a number of purposes including as binders in magnetic recording media. A second aspect of the present invention relates to a method of making the novel copolymers.

A third aspect of the present invention relates to a dispersion for use in magnetic recording media. The dispersion comprises a binder composition comprising the copolymer described above. A magnetizable pigment is dispersed in the composition.

A fourth aspect of the invention relates to novel vinyl/hydroxy functional polyurethane graft copolymer prepared using macromonomer diols. Another aspect of the invention relates to the use of the copolymer in a dispersion for magnetic recording media.

A fifth aspect of the invention relates to dispersions comprising magnetizable pigment dispersed in vinyl/-hydroxy functional polyurethane block copolymer.

A sixth aspect of the present invention relates to a composite for magnetic recording. The composite includes a substrate having a front side and a back side. A cured dispersion comprising a binder composition comprising the above described copolymer is coated on at least one side of the substrate. A magnetizable pigment is dispersed in the cured dispersion.

The invention provides a copolymer comprising:
(a) a polyurethane backbone;
(b) at least one $SO_3M$ group pendant from the polyurethane backbone, wherein the polyurethane backbone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof;
(c) at least two crosslinkable hydroxy groups pendant from the polyurethane backbone, wherein the polyurethane backbone has a hydroxy equivalent weight of from about 500 to about 50,000; and
(d) at least one vinyl polymeric segment pendant from the polyurethane backbone.

The invention also provides a graft copolymer comprising:
(a) a polyurethane backbone;
(b) at least three crosslinkable hydroxy groups pendant from the polyurethane backbone, wherein the polyurethane backbone has a hydroxy equivalent weight of from about 500 to about 50,000; and
(c) at least one vinyl polymeric segment B comprising polymerized polymerizable monomer pendant from the polyurethane backbone.

The invention also provides a method of preparing a copolymer comprising the step of:
(a) reacting
  (i) a macromonomer diol;
  (ii) a sulfonated diol;
  (iii) a polyisocyanate; and
  (iv) a polyol
in sufficient amounts in order to form a sulfonated, hydroxy-functional vinyl/polyurethane copolymer having a hydroxy equivalent weight ranging from about 500 to about 50,000 and a sulfonate equivalent weight ranging from about 2,000 to about 100,000.

The invention also provides a method of preparing a copolymer comprising the steps of:
(a) reacting
  (i) a macromonomer diol;
  (ii) a sulfonated diol; and
  (iii) a polyisocyanate;
wherein said diols and said polyisocyanate are included in amounts such that there is at least about a 5 mole percent excess of reactive isocyanate functionality in the polyisocyanate relative to hydroxy functionality in said diols in order to form an isocyanate terminated prepolymer having at least two reactive isocyanate groups; and
(b) reacting a polyol with the isocyanate terminated prepolymer in order to form a vinyl/polyurethane copolymer wherein the polyol has three reactive hydroxy groups and a hydroxy equivalent weight of at least 60 and the polyol is present in a sufficient amount such that there is at least about a 67% excess of reactive hydroxy groups relative to reactive isocyanate groups and such that the copolymer has a hydroxy equivalent weight of between about 1,000 and about 5,000; and the isocyanate-terminated sulfonated prepolymer is present in a sufficient amount such that the polyurethane copolymer has a sulfonate equivalent weight of between about 2,000 and about 100,000.

The novel vinyl/sulfonated hydroxy functional (vinyl/SHPU) polyurethane copolymers of the present invention overcome the difficulties of known binders used in magnetic recording media in that a substantial portion of the hard resin is pendant from the sulfonated hydroxy functional polyurethane rather than mixed therewith which produces very good compatibility in terms of mechanical properties and optical clarity. These grafted vinyl/SHPU copolymers disperse magnetic pigment as well as sulfonated hydroxy-functional polyurethane itself. Moreover, the vinyl/SHPU copolymers can possess glass transition temperatures which are higher than the glass transition temperatures of the sulfonated hydroxy functional polyurethane thus resulting in a highly stable and durable material.

The novel vinyl/hydroxy functional polyurethane graft copolymers also overcome the difficulties of known binders in that a substantial portion of the hard resin is pendant from the hydroxy functional polyurethane rather than mixed therewith which produces good compatibility. These graft copolymers are typically combined with a dispersant in order to provide a dispersion useful in magnetic recording media since the polyurethane backbone does not contain pendant sulfonate groups.

Dispersions containing the non-sulfonated vinyl/hydroxy functional polyurethane block copolymer are also superior to dispersions known in the art. Such dispersions typically further comprise a dispersant in order to provide a dispersion useful in magnetic recording media.

DETAILED DESCRIPTION OF THE INVENTION

One aspect of the present invention relates to a curable copolymer comprising a sulfonated, hydroxy-functional polyurethane copolymer having one or more polymerized vinyl segments pendant from the polyurethane backbone of the copolymer.

I. Description of Vinyl/Sulfonated Hydroxy Functional Polyurethane Copolymer (Vinyl/SHPU)

I(a). Polyurethane Backbone

The polyurethane backbone of the vinyl/SHPU is similar to the polyurethane backbone of the polymer described in U.S. patent application Ser. No. 07/429,720 (assigned to the assignee of the present case) which is a continuation-in-part of Ser. No. 07/298,046 both incorporated by reference herein, and can be prepared by reacting polyhydroxy compounds with polyisocyanates. One or more of the polyhydroxy compounds having a metal sulfonate group may be used together with other hydroxy compounds having no sulfonate groups such as polyester polyols, polyether polyols, polycarbonate polyols and the like. The present invention incorporates additional hydroxy compounds containing polymerized vinyl macromonomer segments.

The preferred polyurethane backbone may be viewed as comprising a plurality of segments, each segment being a structural fragment resulting from the reaction of a polyol with a polyisocyanate. The individual segments can be viewed as being soluble (hydrophobic) or insoluble (hydrophilic) in character. The term "insoluble" as used herein is meant to refer to a polyurethane segment of such a character that if a moderate to high molecular weight polyurethane (for example about 50,000 weight average) were made exclusively of the segment, the polymer would not be soluble in organic solvents such as methyl ethyl ketone, cyclohexanone, toluene, or tetrahydrofuran. On the other hand, a "soluble" segment is one of such a character that if a moderate to high molecular weight polyurethane (for example 50,000 weight average) were made exclusively of the segment, the polymer would be soluble in the above-mentioned solvents. Although the polyurethane backbone may solely comprise hydrophobic or hydrophilic segments, the preferred polyurethane backbones comprise both soluble and insoluble segments.

Herein, soluble (hydrophobic) and insoluble (hydrophilic) segments are generally identified and distinguished by relative molecular weight, chain length, and/or relative amount of polar functionality or character. That is, one way for identifying or defining these segments involves a comparison of the ratios of the number of carbon atoms to polar groups in the segment precursor. The term "polar group" as used in this context is meant to refer to such highly polar groups as hydroxy-, sulfonate-, amino-, urethane-, and urea-groups, but not ester, carbonate, or ether functionality. In general, a ratio of less than about 3:1 identifies a precursor to an insoluble segment; whereas, a ratio of greater than about 3:1 identifies a precursor to a soluble segment. For example, under this model neopentyl glycol (5 carbons/2 polar groups) is a precursor to an insoluble segment, and a polycaprolactone triol such as Union Carbide Tone ™ 0305 (about 28 carbons/3 polar groups) is a precursor to a soluble segment.

I(b) SO$_3$M Groups

At least one SO$_3$M group is pendant from the polyurethane backbone. The term "pendant" as used herein refers both to a moiety bonded to an interior portion of the polyurethane backbone as well as to a moiety bonded to a terminal portion of the polyurethane backbone. The polyurethane backbone has an SO$_3$M group equivalent weight of from about 2,000 to about 100,000, most preferably about 5,000 to 30,000. The cation M designates a cation selected from the group consisting of H$^+$, the alkali metal cations, i.e., Na$^+$, Li$^+$, and K$^+$, and NR$_4^+$ wherein R can be hydrogen or an alkyl group. When R comprises an alkyl group, R preferably comprises a C$_1$–C$_4$ alkyl group. M is preferably selected from the group consisting of Na$^+$, K$^+$, and mixtures thereof, since the corresponding acids, if present in the final copolymer, may tend to produce an overall copolymer that is subject to decomposition. Most preferably, M comprises Na$^+$ for reasons of commercial availability.

Preferably, the SO$_3$M group is an aromatic SO$_3$M group (i.e., pendant from an aromatic moiety incorporated into the polyurethane backbone), wherein M is Na$^+$, since at least one example of this type of compound is readily available from commercial sources, it can be easily incorporated into the polyurethane backbone, and its properties are well known. This preferred aromatic sodium sulfonate compound is dimethyl sodium sulfoisophthalate (DMSSIP).

I(c). Hydroxy Groups

At least two cross-linkable hydroxy groups are pendant from the polyurethane backbone. The polyurethane backbone has a cross-linkable hydroxy group equivalent weight of from about 500 to 50,000, preferably, about 1,000 to 5,000. For magnetic binder use preferably a majority, more preferably 90% or more, and most preferably all, of the cross-linkable hydroxy groups are pendant from hydrophobic polymer chain segments. That is, the cross-linkable hydroxy groups are preferably positioned within the polyurethane polymer at locally hydrophobic sites.

By the term "locally hydrophobic" it is meant that the cross-linkable hydroxy groups are located in portions of the polyurethane backbone that do not include, in the immediate vicinity of a hydroxy group, any moieties that are substantially polar or hydrophilic. Preferably, the hydroxy groups are each positioned in polymer chain segments having lengths of at least about 5 atoms separating the hydroxy group from the nearest polar group. Alternatively phrased, if the hydroxy group is positioned in a substantially hydrophobic fragment or segment whose precursor has a molecular weight of at least about 180, and preferably about 200 to about 1,000, it will be considered to be in a hydrophobic environment (or soluble segment). Most preferably, the hydroxy functionality is substantially centrally positioned within such a fragment or segment. The term "cross-linkable" and variants thereof, when used to refer to moieties in a copolymer, is meant to refer to moieties available for cross-linking in final cure. It is not meant or implied that all cross-linkable moieties are necessarily cross-linked during final cure.

Vinyl/SHPU binders according to the present invention are uniquely characterized by the hydrophobic environment in which most of the cross-linkable hydroxy groups are presented relative to the environment of the sulfonate dispersing moiety. When such is the case, the resultant vinyl/SHPU copolymer generally exhibits relatively low dispersion viscosity when loaded with pigment. For example, a polyurethane copolymer binder dispersion according to the present invention generally exhibits a dispersion viscosity of less than about 20,000 centipoise and preferably less than about 5,000 centipoise. Being characterized by a low dispersion viscosity, the vinyl-polyurethane copolymer compositions according to the present invention provide magnetic recording media having high squareness.

I(d). Pendant Polymerized Vinyl Segments

The polyurethane backbone possesses one or more pendant vinyl polymeric segments in order to form a graft or block copolymer. The polyurethane backbone typically possesses on average about 0.5 to about 2 pendant polymerized vinyl segments. The weight ratio of the polyurethane backbone to the pendant polymerized vinyl segment(s) ranges from about 99.5:0.5 to about 10:90, preferably about 95:5 to about 20:80. The preferred weight ratio of polyurethane backbone to pendant polymerized vinyl segment(s) for copolymers useful in magnetic recording media preferably ranges from about 95:5 to about 30:70. The molecular weight of each pendant polymerized vinyl segment typically ranges from about 1000 to about 20,000, preferably about 5000 to about 15,000, in order to obtain the desired phase separation. The glass transition temperature of the pendant polymerized vinyl segment(s) can range from about $-180°$ C. to about $150°$ C., preferably about $20°$ C. to about $120°$ C. and, for magnetic binder use, above about $50°$ C., preferably about $50°$ C. to $100°$ C. in order to obtain the desired hardness, stiffness and dimensional stability.

The polymerized vinyl segment(s) comprise polymerized polymerizable monomer. Useful monomers include but are not limited to those following selected from the group consisting of: styrene, halogenated styrenes, alkylated styrenes, methoxystyrenes, acrylic acid, methacrylic acid, acrylonitrile, acrylamide, methacrylamide, methylmethacrylate, methyl acrylate, ethyl acrylate, isopropyl acrylate, n-butyl acrylate, 2-ethylhexyl acrylate, isobornyl acrylate, glycidyl acrylate, vinyl chloride, vinylidene chloride, vinyl acetate, vinylidene fluoride, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, other acrylic acid esters and amides, other methacrylic acid esters and amides, and mixtures thereof. Preferably, the monomer is selected from the group consisting of styrene, methylmethacrylate, and a mixture of styrene and acrylonitrile.

II. Methods of Preparing Vinyl/SHPU Copolymer

The general method of preparing a vinyl/SHPU copolymer according to the present invention comprises the step of reacting a macromonomer diol; a sulfonated diol; a polyisocyanate; and a polyol in sufficient amounts in order to form a sulfonated, hydroxy-functional vinyl/polyurethane copolymer having a hydroxy equivalent weight ranging from about 500 to about 50,000 and a sulfonate equivalent weight ranging from about 2,000 to about 100,000.

According to a preferred method of the present invention, a curable, vinyl/SHPU copolymer which is particularly useful in magnetic recording media can be prepared by reacting a polyol with an isocyanate-terminated sulfonated prepolymer having at least two reactive isocyanate groups.

II(a). Polyol

The term "polyol" as used herein refers to polyhydric alcohols containing two or more hydroxyl groups. The polyol can be hydrophilic or hydrophobic. Preferably, the polyol is hydrophobic. Preferably, the polyol has at least three reactive hydroxy groups and has a hydroxy equivalent weight of at least about 60. Such a polyol can be reacted with the isocyanate-terminated sulfonated prepolymer to prepare a polyurethane copolymer having at least four hydroxy groups available for later cross-linking during cure of the polymer. Preferably, the polyol is present in a sufficient amount such that there is at least about a 67% excess of reactive hydroxy groups relative to reactive isocyanate groups.

Typically, the polyol is a triol. Preferred triols have molecular weight greater than about 180, most preferably, about 200 to about 1,000. A preferred class of triols comprises polycaprolactone triols. One particularly useful triol is a polycaprolactone triol having a hydroxy equivalent weight of about 180 and a molecular weight of approximately 540. One such high molecular weight triol is available under the trade designation Tone TM 0305 from Union Carbide Company. Other useful polyols include polypropylene oxide triol, and polyester triols other than polycaprolactone triols, e.g. butylene adipate triols or polyols. Preferably the hydroxy groups in the triol are primary in order to facilitate curing of the resultant copolymer with a curing agent. The reaction of primary alcohols with a isocyanate-terminated sulfonated prepolymer is relatively rapid at temperatures of about $45°$ C. to $70°$ C. In some instances catalysts, such as dibutyltin dilaurate or dimethyltin dilaurate, may be used to facilitate reaction. It is foreseen, however, that some secondary triols may be utilized according to the present invention. It is also foreseen that mixtures of various triols may be utilized.

II(b). Isocyanate-Terminated Sulfonated Prepolymer

The isocyanate-terminated sulfonated prepolymer can be prepared by reacting a sulfonated diol, a macromonomer diol, and optionally additional short chain or long chain diols (including polycaprolactone diols, polyols, etc.) with an excess of polyisocyanate. Preferably, there is at least about a 5 mole % excess of isocyanate functionality in the polyisocyanate relative to hydroxy functionality in the sulfonated diol.

II(b)(i). Polyisocyanates

A wide variety of polyisocyanates may be utilized. A particularly well-known and useful class of polyisocyanates are diisocyanates such as diphenylmethane diisocyanate. Other useful diisocyanates include those selected from the group consisting of isophorone diisocyanate, toluene diisocyanate, hexamethylene diisocyanate, tetramethylene diisocyanate, and p-phenylene diisocyanate. It is noted that mixtures of diisocyanates can also be used.

II(b)(ii). Sulfonated Diols

A preferred class of sulfonated diols (also referred to herein as sulfonated monomers) can be prepared from the reaction of from about two to about four equivalents of an appropriate diol per equivalent of dimethyl sodium sulfoisophthalate (DMSSIP). The isophthalate includes two ester groups that can be readily esterified, by reaction with two equivalents of diol, to lead to an extended diol structure having an aromatic sulfonate group therein. In some instances, catalysts such as tetrabutyltitanate may be used to facilitate the reaction.

The reaction is generally represented by the following scheme:

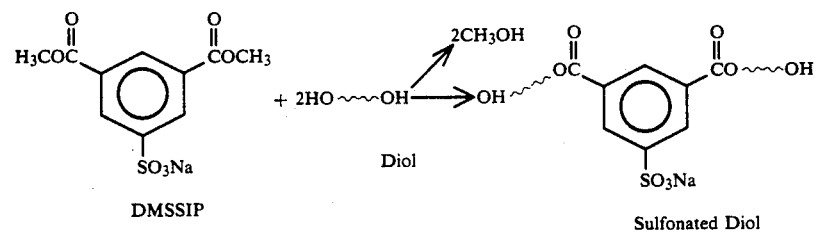

A variety of diols may be utilized. Also, mixtures of diols can be used. A preferred class of diols are oligomeric diols defined as diols having a hydroxy equivalent weight greater than about 200. Most preferred are the polycaprolactone diols having a hydroxy equivalent weight of from about 200 to 2,000. One such material is Tone TM 0210, available from Union Carbide Company. Tone TM 0210 is a polycaprolactone diol having a hydroxy equivalent weight of about 415. The result of reaction of about 4 equivalents of Tone TM 0210 per equivalent of DMSSIP is an oligomeric sulfonated diol having a hydroxy equivalent weight of about 600 and a centrally located aromatic sulfonate group.

Other diols which may be reacted with DMSSIP, in order to provide a sulfonated monomer include: polyether diols such as polytetramethylene glycols and polypropylene glycols; polycarbonate diols such as Duracarb 120, a polycarbonate diol available from PPG Industries, Inc.; and polyester diols, such as a polyester diol that is the reaction product of adipic acid and butane diol. Additionally, sodium dimethyl-5-sulfoisophthalate or sodium-5-sulfoisophthalic acid may be utilized with: other diesters or diacids including dimethyl isophthalate, dimethyl terephthalate, and dimethyl adipate; and, diols to produce co-polyester diols containing sulfonate. Some examples of such diols are: ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl-1,3-pentane diol; 1,4-cyclohexanedimethanol; ethylene oxide and/or propylene oxide adduct of bisphenol A; ethylene oxide and/or propylene oxide adduct of hydrogenated bisphenol A; polyethylene glycol; polypropylene glycol; and, polytetramethylene glycol.

II(b)(iii). Macromonomer Diol

Examples of useful macromonomer diols include but are not limited to those available from Toagosei Chemical Industry Co., Ltd. that have a molecular weight of about 6000 and possess diol functionality at one end. The macromonomer diol can comprise methylmethacrylate monomer, (available under the trade designation HA-6 from Toagosei), styrene monomer (available under the trade designation HS-6 from Toagosei), and a combination of styrene and acrylonitrile monomer (available under the trade designation HN-6 from Toagosei).

Other polymerizable monomers can be used in preparing useful macromonomer diols. The monomers used in preparing the macromonomer diols should not have any reactive sites toward the polyisocyanates used to prepare the copolymers of the invention. For example, hydroxy ethyl methacrylate macromonomer would not be useful in the present invention since it would result in a gelled product. Examples of additional monomers which the macromonomer diols useful in preparing the copolymers of the present invention can comprise include the previously mentioned monomers which it was indicated that the vinyl polymeric segment(s) could comprise. It is foreseen that telechelic macromonomer diols which are functionalized at both ends of the macromonomer chain as opposed to those possessing difunctionality at one end of the macromonomer chain would work well in the present invention. However, telechelic macromonomer diols are less readily available. Rather than obtaining macromonomer diols commercially, the macromonomer diols can be prepared by conventional methods known to those skilled in the art, such as those described in Chuyo, Y. et al., *Polymer Bulletin*, 8, 239 (1982).

II(b)(iv). Optional Components

Optionally, it may be desirable to use other polyols to prepare the vinyl/SHPU copolymer in order to give preferred characteristics to the copolymer. For example, chain extension agents may be incorporated into the polyurethane backbone, to improve ductility or strength characteristics. Such agents are typically short chain and long chain diols such as neopentyl glycol, 1,4-butane diol, 1,6- hexane diol, cyclohexane dimethanol, ethylene glycol, and polyester polyols such as Tone TM 0210 and Tone TM 0230, otherwise referred to herein as non-sulfonated diols. Preferably, at least some low molecular weight (less than about 120) diols, i.e., non-sulfonate-containing diols, are used to provide preferred characteristics to the overall product. Also, higher molecular weight non-sulfonated diols, such as the polycaprolactone diols Tone TM 0210 or Tone TM 0230, may be used to provide preferred characteristics to the product. Examples of optional polyols which may be used in forming isocyanate-terminated sulfonated prepolymer also include fluorinated diols such as $C_8F_{17}SO_2N[(CH_2)_2OH]_2$. Fluorinated diols can be used in an amount such that the fluorinated diol comprises about 0.1 to about 20 weight-percent of the polyurethane backbone. It is further noted that for any of the reactants mentioned, mixtures of materials can be utilized.

The preferred method of preparing the vinyl/SHPU copolymers according to the present invention comprises the reaction of the four key components described above: the sulfonated diol plus any optional diols; the macromonomer; the polyisocyanate; and the polyol which is preferably a hydrophobic triol. This preferred method shall be referred to herein as the "prepolymer synthetic method". This method is designed to ensure that substantially all of the unreacted hydroxy groups in the copolymer that are available for final cure are those hydroxy groups that are pendant from the triol, i.e., the hydrophobic segment precursor. It is noted that if all of the diols are also hydrophobic, i.e., soluble, material, it may not be necessary to ensure that all unreacted hydroxy groups result from the triol.

In a first step, the sulfonated diol, any optional polyols such as non-sulfonated diols, and the macromonomer are reacted with the polyisocyanate in order to form an isocyanate-terminated sulfonated prepolymer. There should be sufficient isocyanate functionality, preferably an excess thereof, for substantially complete reaction of the diol hydroxy groups. For example, there should preferably be at least about a 5 mole percent excess of reactive isocyanate functionality in the polyisocyanate relative to hydroxy functionality in the diol and optionally-added polyols. This provides an isocyanate-terminated sulfonated prepolymer with no residual hydroxy functionality. In a second step, the isocyanate-terminated sulfonated prepolymer product of the first step is reacted with an excess of the triol. The triol should have little polar functionality other than the hydroxy groups, and the hydroxy groups should be well spaced in the triol.

As one example of the preferred prepolymer synthetic method, a sulfonate diol monomer, neopentyl glycol, a macromonomer diol, and diphenylmethane diisocyanate are combined in methyl ethyl ketone solvent in a ratio such that the number of isocyanate groups per hydroxy group is initially about 1.3. After all available hydroxy groups have been reacted, a prepolymer is obtained containing an excess of isocyanate. The prepolymer is subsequently reacted with a hydrophobic triol such that the ratio of isocyanate groups to hydroxy groups is within the range of about 0.3 to about 0.6. The resultant polyurethane copolymer product has crosslinkable hydroxy groups pendant from hydrophobic polymer chain segments comprising the triol.

An alternate method involves changing the order of sulfonated diol addition to ensure that essentially all of the macromonomer is directly linked to only one type of polyol. This often creates desireable phase compatibility characteristics in the final copolymer; for example, it can promote phase mixing between the macromonomer and polyol leading to better homogeneity and a higher glass transition temperature ($T_g$) To accomplish this, the macromonomer diol is first reacted with an excess of polyisocyanate and diphenylmethane diisocyanate (MDI) to yield a prepolymer which is then reacted with an excess of hydroxyl functionality from the sulfonated diol. The resulting hydroxyl functional material is then carried through the typical synthesis wherein additional diols, an excess of MDI, and ultimately an excess of triol are added.

III. Description of Vinyl/Hydroxy Functional Polyurethane Copolymers (Vinyl/HPU)

Vinyl/HPU block and graft copolymers are also useful in the dispersions of the present invention. The vinyl/HPU copolymers are similar to the vinyl/SHPU copolymers described above except that they do not contain any pendant sulfonate groups. Moreover, such copolymers should contain at least 3 hydroxy groups pendant from the polyurethane backbone.

IV. Methods of Preparing Vinyl/HPU

The graft and block vinyl/HPU can be formed according to the method of preparing vinyl/SHPU described above except that the sulfonated diols would be omitted from the formulation and replaced by suitable non-sulfonated diols such as Tone TM 0210 polycaprolactone diol available from Union Carbide, or other non-sulfonated diols such as polyester diols, polyether diols, polycarbamate diols, and the like.

V. Dispersions of Vinyl/SHPU for Use in Magnetic Media

A magnetic pigment can be readily dispersed within the resulting vinyl/SHPU copolymer binder composition, dispersion being facilitated by the incorporated sulfonate moiety. The resulting dispersion can then be readily applied to the selected substrate, and cured through reaction of the remaining hydroxy groups. Dispersions for use in preparing magnetic recording media of the present invention generally comprise a magnetic or magnetizable pigment and a curable polymer, as described above.

The preparation of dispersions of magnetic pigments with the vinyl/SHPU copolymer, as characterized by the present invention, is relatively straight-forward. As indicated, addition of wetting agents or dispersing agents can generally be avoided, even with relatively high load situations, i.e., about 70% to 85% by weight of magnetic pigment relative to binder, used in the preparation of high density media, represented by about 45,000 flux changes per inch. A variety of pigments may be used, including: ferric oxides; gamma ferric oxide; cobalt doped gamma feric oxides; chromium oxide; iron; iron-cobalt; cobalt; nickel; cobalt-nickel; cobalt-phosphorus; and barium ferrite.

It is foreseen that a variety of loadings, densities, solvent systems, etc., may be utilized. The following conditions are typical, and were employed in preparation of some of the dispersions reported in the examples below (parts by weight unless otherwise noted): about 100 parts of fine pigment such as (Co-$\gamma$-$Fe_2O_3$) having a surface area 50 $m^2/g$ and a powder coercivity of 780 Oersted; about 15 to 40 parts of binder (i.e., copolymer); about 150 to 400 parts of solvent are combined with steel or glass milling media in a steel container and milled by agitation until the pigment is dispersed. This dispersion can be readily cured with multi functional isocyanate curing agents. After a dispersion containing pigment, solvent, and binder is prepared, a curative is typically added. A typical curative comprises, for example, a triisocyanate such as the adduct of toluene diisocyanate with trimethylol propane. One such material is available under the trade designation Mondur ™ CB-601 from Mobay Chemical Company. The curative is preferably added in a proportion of about 1-20% based upon the binder weight. The resulting dispersion can be readily applied to polyethylene terephthalate film using a knife coating method. Immediately after coating and while the solvent is still present and the binder is substantially uncured, the coated substrate typically undergoes orientation in a magnetic field to align the magnetic particles. After coating and orienting the substrate is dried of solvent and cured. The curing retains the pigment in the oriented manner. Curing can take place either at room temperature or at elevated temperatures (50°-60° C.).

A variety of additives can be incorporated into the dispersion useful in the present invention. These include head-cleaning agents and lubricants. Wetting agents and dispersants, although usable, can generally be avoided when using the vinyl/SHPU of this invention. If the binder described herein is used as a back-coat for magnetic media, the back-coat can optionally include non-magnetizable pigments, such as, for example, carbon black, graphite, aluminum oxide, titanium dioxide, zinc oxide, silica gel, calcium carbonate, and barium sulfate. The binder described herein can be used to prepare magnetic media such as tapes, e.g., video tapes, computer tape and data cartridge tape, and diskettes, both single-sided and double-sided.

VII. Dispersions of Vinyl/HPU for Use in Magnetic Recording Media

Dispersions of vinyl/HPU block and graft copolymers can be prepared according to the method described above for preparing vinyl/SHPU dispersions except for the addition of an effective amount of a suitable dispersing agent, preferably about 1 to about 10 weight percent based upon pigment weight in order to disperse the pigment. Suitable dispersants include lethicin and quaternary ammonium acetates or phosphates such as Emcol ™ acetate, a polypropylene oxide adduct of diethyl ethanolamine quarternized with ethylene oxide and acetic anhydride, having a molecular weight of about 2300, and Emcol ™ phosphate, a polypropylene adduct of diethyl ethanolamine quarternized with ethylene oxide and phosphoric acid. Both are available from Witco Chemical Co. and are disclosed in U.S. Pat. No. 4,837,082 incorporated by reference herein.

About 1 to 10 weight percent of a wetting agent may be included based upon the weight of the pigment. Suitable wetting agents include phosphoric acid esters such as mono-phosphorylated propylene oxide adducts of glycerine, e.g., the reaction product of 1 mole of phosphorous oxychloride with the reaction product of 10-11 moles of propylene oxide and 1 mole of glycerine.

The magnetic recording medium comprising vinyl/HPU is preferably prepared by mixing crude particulate solid pigment into a mixture comprised of solvent, wetting agent, and dispersing agent. At least a portion of the crosslinkable copolymer is then added to form a wetting slurry. The wetting slurry is then milled until the average particle size of the crude magnetic particles is small enough such that the dispersion exhibits the desired smoothness. Any remaining copolymer and additional fluidizing solvents can be added after milling. The milling process will yield a stable dispersion of finely divided magnetic particles dispersed in a fluidizing solvent. This stable dispersion is then mixed with the crosslinker to form a curable composition and coated and cured as described above.

The detailed description includes exemplary preparations of the vinyl/polyurethane graft copolymers in accordance with the invention. All parts and percentages throughout the Specification, including the Examples, are by weight unless otherwise indicated.

In the following examples, the following agents are used:

Tone ™ 0210 —a polycaprolactone diol produced by Union Carbide, molecular weight about 825, hydroxy equivalent weight about 415, precursor to a sulfonate diol.

Duracarb ™ 120 —an aliphatic polycarbonate diol, molecular weight about 900, from PPG Industries, Inc.

FOSE EE—N,N-bis(2-hydroxyethyl)-perfluorooctylsulfonamide available from 3M Company.

Neopentyl glycol—a low molecular weight diol, molecular weight 104, hydroxy equivalent weight 52, additive for providing preferred characteristics.

DMSSIP-dimethyl sodium sulfoisophthalate, an aromatic sodium sulfonate salt, molecular weight 296, sulfonate equivalent weight 148, preferred metal sulfonate salt, available from DuPont.

Tone ™ 0305 —a polycaprolactone triol available from Union Carbide, molecular weight about 540, hydroxy equivalent weight about 180, about 28 carbons/3 polar groups, precursor to a soluble segment.

Tone ™ 0301 —a polycaprolactone triol produced by Union Carbide, molecular weight about 297, hydroxy equivalent weight about 99, about 15 carbons/3 polar groups, precursor to a soluble segment.

Diphenylmethane diisocyanate—an isocyanate, molecular weight 250, isocyanate equivalent weight 125.

Mondur ™ CB-601 —a triisocyanate available from Mobay Chemical Company. CB-601 is a toluene diisocyanate-based adduct of unspecified triols and diols which contains 10.4% NCO and is supplied as a 60% solution in ethylene glycol diacetate.

HA-6 —methylmethacrylate macromonomer diol available from Toagosei having a molecular weight of about 6000.

HS-6 —styrene macromonomer diol having a molecular weight of about 6000 available from Toagosei.

HN-6—styrene/acrylonitrile macromonomer diol having a molecular weight of about 6000 available from Toagosei.

MOGUL-L—a carbon black available from Cabot Corporation having an average particle size of 24 nanometers and surface area of 138 square meters/gram.

Definition of Terms

Glass Transition Temperature

The glass transition temperature ($T_3$) is a well known temperature at which amorphous material changes from a glassy state to a ductile state.

Equivalent Weight

The term "equivalent weight", as used herein with respect to a functionality or moiety, refers to the mass of polymer per mole, or equivalent, of functionality.

Differential Scanning Calorimetry

A small amount of dried film was placed in the DSC chamber of a Perkin-Elmer DSC-2 differential scanning calorimeter under nitrogen atmosphere. The sample was cooled from room temperature to −50° C. and then heated to 150° C. at 20° C. per minute. The $T_g$ was taken as the midpoint of the curve in the glass transition region.

Inherent Viscosity

The inherent viscosity of each composition was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.8 grams per deciliter of polymer in tetrahydrofuran solvent) and the flow time of the solvent. In each experiment, inherent viscosity is reported in deciliters per gram.

ICI Viscosity

The ICI viscosity of various magnetic media binder dispersions of the invention were measured on an ICI Rotating Cone and fixed plate viscometer from Research Equipment, Ltd. (London) which provided a measurement of viscosity in centipoise.

EXAMPLE 1

Preparation of Polycarbonate Sulfonate Monomer

Into a 2 liter reaction flask were charged 938.3 grams (2.124 equivalents) of Duracarb 120 polycarbonate diol, 78.66 grams (0.531 equivalent) of DMSSIP, and 0.5 grams of tetrabutyltitanate. The flask contents were heated to 210° C. under nitrogen and held for 3 hours while collecting methanol distillate. After cooling to 120° C., a vacuum was pulled on the reaction and the flask contents were heated to 150° C. for 1½ hours. The hydroxy equivalent weight by analysis was determined to be 545 grams/equivalent. The calculated sulfonate equivalent weight was 3766 grams/equivalent.

EXAMPLE 2

Preparation of 25 Wt-% HN-6 Polycarbonate SHPU

Into a 500 ml reactor flask were charged 22.78 grams (0.008 equivalent) of HN-6 macromonomer and 268 grams of tetrahydrofuran (THF). The flask contents were mixed and 200 grams of THF were distilled away. Next, 4.37 grams (0.035 equivalent) of diphenylmethane diisocyanate (MDI), and 0.1 gram of dibutyltindilaurate were added to the the flask and the flask contents were heated at reflux for 1 hour. 37.4 grams (0.069 equivalent) of polycarbonate sulfonate monomer prepared according to Example 1 was added to the flask and the mixture was heated at reflux for ½ hour. 11.63 grams (0.093 equivalent) MDI and 1.16 grams (0.022 equivalent) of neopentyl glycol were added to the flask and reflux was maintained 2 hours. 13.81 grams (0.074 equivalent) of Tone TM 0305 polycaprolactone triol and 23 grams of THF were added to the flask and heating at reflux was continued for 1 hour. The polymer inherent viscosity was 0.289.

EXAMPLE 3

Preparation of Sulfonate Monomer

Into a 94 l reaction vessel were charged 67.8 kg (163 equivalents) of Tone TM 0210 polycaprolactone diol, 8.2 kg of toluene, and 5.72 kg of DMSSIP (39 equivalents). The vessel contents were heated to 80° C. with distillation of toluene. The remainder of the toluene was removed under vacuum at 110° C. The vacuum was released under nitrogen and 40 grams of tetrabutyl titanate were added to the reaction vessel. The system was heated to 200° C. under nitrogen and held for 3 hours while collecting methanol distillate. After cooling to 120° C., a vacuum was pulled on the reaction and the conditions were maintained for 4 hours. The resultant product was then filtered and cooled. The hydroxy equivalent weight by analysis was determined to be 603 grams/equivalent. The calculated sulfonate equivalent weight was 3745 grams/equivalent.

EXAMPLE 4

Preparation of 25 Wt-% HA-6, 5 Wt-% FOSE EE Diol SHPU

Into a 500 ml reactor flask were charged 21.4 grams (0.007 equivalent) of HA-6 macromer, 4.3 grams (0.015 equivalent) of FOSE EE diol, and 339 grams of THF. The flask contents were mixed and 200 grams of THF were distilled away. 24.19 grams (0.193 equivalents) of MDI and 0.1 gram of dibutyltin dilaurate were added to the flask and the reaction was heated at reflux for 1 hour. 19.8 grams (0.032 equivalent) of sulfonate monomer prepared according to Example 3 and 5 grams (0.095 equivalent) of neopentyl glycol were added to the flask and the reaction was heated at reflux for 2 hours. 11.04 grams (0.112 equivalent) of Tone TM 0301 polycaprolactone triol and 21 grams of THF were added to the flask and the mixture was heated at reflux for 1 hour. The polymer inherent viscosity was determined to be 0.192. One additional charge of MDI at 2.5 grams was added to obtain a final inherent viscosity of 0.233.

EXAMPLES 5-6

The same procedure was followed as in Example 4 except for various differing components and amounts set forth below.

EXAMPLE 5

Polycarbonate monomer of Example 1 in place of monomer of Example 3 (99 grams); macromonomer diol (115.2 grams/HA-6); FOSE EE diol (22.95 grams); neopentyl glycol (26.1 grams); MDI (130.05 grams); Tone TM 0301 polycaprolactone triol (69.46 grams); correction charge of MDI (33.0 grams); and total solvent (860 grams—methyl ethyl ketone (MEK)).

EXAMPLE 6

Polycarbonate monomer of Example 1 in place of monomer of Example 3 (99 grams); macromonomer diol (115.2 grams/HN-6); FOSE EE diol (22.95 grams); neopentyl glycol (26.1 grams); MDI (130.05 grams); polycaprolactone triol (69.46 grams Tone TM 0301); correction charge of MDI (27.7 grams); and total solvent (860 grams MEK).

EXAMPLE 7

Preparation of 10 Wt % HA 6 SHPU Copolymer

Into a 1000 ml reactor flask were charged 15.7 grams ( 005 equivalent) of HA-6 macromonomer, 44 grams (0.071 equivalent) of sulfonate monomer prepared according to the procedure of Example 3, 11 grams (0.212 equivalent) of neopentyl glycol, and 468 grams of THF. The flask contents were mixed and 250 grams of THF were distilled away. Next, 46.76 grams (0.374 equivalent) of MDI and 0.1 gram of dibutyltin dilaurate were added to the flask and the reaction was heated at reflux for 1.5 hours. 38.84 grams (0.215 equivalent) of Tone™ 0305 polycaprolactone triol and 72 grams of THF were then added and the mixture was heated at reflux for 3 hours. The inherent viscosity was determined to be 0.192. Two additional charges of MDI totaling 5.3 grams were added in order to obtain a final inherent viscosity of 0.346.

EXAMPLES 8-10

The same procedure was followed as in Example 2 except for various differing components and amounts set forth below.

EXAMPLE 8

Sulfonate monomer of Example 3 (87.5 grams); macromonomer diol (32.04 grams/HN-6); neopentyl glycol (23.28 grams); MDI (98.99 grams); polycaprolactone triol (78.63 grams Tone™ 0305); correction charge of MDI (9.03 grams); and total solvent (695 grams/MEK).

EXAMPLE 9

Sulfonate monomer of Example 3 (35.2 grams); macromonomer diol (38.4 grams/HA-6); neopentyl glycol (8.8 grams); MDI (38.81 grams); polycaprolactone triol (32.24 grams Tone™ 0305); correction charge of MDI (4.00 grams); and total solvent (285 grams/THF).

EXAMPLE 10

Sulfonate monomer of Example 3 (1335 grams); macromonomer diol (105.8 grams/HN-6); neopentyl glycol (22.5 grams); MDI (111.42 grams); polycaprolactone triol (48.36 grams Tone™ 0301); and total solvent (786 grams MEK).

EXAMPLE 11

Preparation of 50 wt % HA-6 SHPU Copolymer

Into a 2 l reaction flask were charged 77.5 grams (0.026 equivalent) of HA-6 macromonomer and 990 grams of THF. 750 grams of THF was distilled off and 27.15 grams (0.217 equivalent) of MDI and 0.1 gram of dibutyltin dilaurate were added and the reaction was held at reflux for 3.5 hours. Next, 22.0 grams (0.035 equivalent) of sulfonate monomer prepared according to Example 3 and 5.5 grams (0.106 equivalent) of neopentylglycol were added and the reaction was held at reflux for 1.75 hours. 22.56 grams (125 equivalent) of Tone™ 0305 polycaprolactone triol and 42 grams of THF were added and reflux was continued for 1 hour. The inherent viscosity was determined to be 0.188. 3.3 grams (0.0264 equivalent) of MDI was added and the reaction was held at reflux for 1 hour. The final inherent viscosity was determined to be 0.307.

Procedure for Measuring Polymer Percent Cure

For each of the copolymer samples prepared according to Examples 7-11 above, 4 grams of a 25% solids solution in THF of each sample was added to 0.13 gram of Mondur™ CB-601 triisocyanate. Each solution was coated at a 1 to 2 mil thickness onto a polypropylene backing film in order to form a composite. Each composite was placed in a 65° C. oven for 5 minutes. The composites were subsequently stored at 21° C. and 50% relative humidity for 7 days whereupon the polyurethane film was peeled from the polypropylene backing. A weighed sample of the polyurethane film was placed in approximately 25 grams of THF for 2 hours. The solvent was decanted into a weighed pan and evaporated at 105° C. for 2 hours. The percent cure was calculated as follows and the results reported in Table I.

polymer % cure =

$$100 \times \frac{[(\text{weight of polymer film}) - (\text{weight extracted})]}{(\text{weight of polymer film})}$$

Inherent Viscosity Measurement

The inherent viscosity for each of the copolymer samples prepared according to Examples 7-11 was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.8 grams per deciliter of polymer in THF solvent) and the flow time of the solvent. In each experiment, inherent viscosity is reported in deciliters per gram. The results are reported in Table I. The data contained in Table I demonstrates that good cure is obtained.

TABLE I

| Sample | % Cure | OH Eq Wt | SO3 Eq Wt | Inherent Viscosity decileters/grams | Tg °C. |
|---|---|---|---|---|---|
| Example 2 25 wt % HN6 PC SHPU | — | 2785 | 9177 | 0.29 | 7.5 |
| Example 4 25 wt % HA6 5% FOSE EE SHPU | — | 1764 | 15890 | 0.23 | 33 |
| Example 5 25 wt % HA6 5% FOSE EE PC SHPU | 94 | 2406 | 17604 | 0.26 | 57 |
| Example 6 25 wt % HA6 5% FOSE EE PC SHPU | 78 | 2406 | 17604 | 0.27 | 59 |
| Example 7 10 wt % HA6 | 91.5 | 1651 | 12937 | 0.35 | 25 |
| Example 8 10 wt % HN6 | 86.6 | 1700 | 14000 | 0.30 | 26 |
| Example 9 25 wt % HA6 | 86.6 | 1946 | 15814 | 0.30 | 25 |
| Example 10 25 wt % HN6 | 70.4 | 1950 | 11000 | 0.19 | 30 & 82 |
| Example 11 50 wt % HA6 (MDI) | 83.8 | 2785 | 25343 | 0.31 | 37 & 98 |
| Example 15 25 wt % HN6 HPU | — | 2456 | — | 0.27 | 26 |

EXAMPLE 12

Preparation of Dispersions

Dispersions A, B, and C, using the vinyl/SHPU copolymers prepared in accordance with Examples 7, 9, and 11, respectively, were prepared as follows: 25 parts by weight of fine Co-γ-Fe$_2$O$_3$ pigment having a specific surface area of 50 m$^2$/g, 8.3 parts by weight vinyl/SHPU copolymer, and 70 parts by weight THF were combined with 250 grams of ⅛" steel milling media in a 150 ml steel milling container. The milling container was capped and placed in a paint shaker for 30 minutes and then allowed to sit for 20–30 minutes. This alternating procedure was continued for 1.5 hours. After milling the sample was drained in a 120 ml widemouth jar. A control dispersion was prepared from SHPU prepared according to Control Example 15 in the same manner. The inherent viscosity, magnetic dispersion viscosity, and dispersion smoothness (examined under a microscope) for these dispersions are presented in Table II.

CONTROL EXAMPLE 13

Preparation of SHPU 92 kilograms of MEK, 4.0 kilograms of neopentyl glycol (76.3 equivalents), and 15.9 kilograms of sulfonate monomer prepared according to Example 3 (30.9 equivalents) were combined and 14 kilograms of MEK were distilled off. 17.4 kilograms of MDI (139.4 equivalents) and 23 grams of dibutyltindilaurate were added. The reaction was held at 35° C. for 3 hours whereupon this prepolymer solution was drained to a holding container.

22 kilograms of MEK and 12.1 kilograms of Tone TM 305 (66.6 equivalents) were combined in the reaction vessel whereupon the prepolymer solution was added to this reaction mixture with stirring. After the isocyanate had reacted, a further addition of 1.3 kilograms of MDI gave a final inherent viscosity in tetrahydrofuran of 0.29. The product had a hydroxy equivalent weight measured to be 1700 grams/equivalent and the sulfonate equivalent weight was calculated to be 11,000 grams/equivalent.

TABLE II

| Dispersion | Inherent Viscosity | ICI Magnetic Dispersion Viscosity (centipoise) | Dispersion Smoothness |
|---|---|---|---|
| A | 0.35 | 23 | Good |
| B | 0.30 | 11 | Good |
| C | 0.31 | 17 | Good |
| SHPU Control | 0.30 | 14 | Good |

The data in Table IV show that all 3 macromonomer dispersions have the same excellent characteristics as the SHPU Control. Each has a low magnetic dispersion viscosity indicating that the dispersions will have excellent coating and magnetic orientation properties.

EXAMPLE 14

Preparation of Dispersions

Dispersions D, E, and F, using the vinyl/SHPU copolymers prepared in accordance with Examples 4, 5, and 6, respectively were prepared according to Example 15 except that the ratio of charges were 28.5% Co-γ-Fe₂O₃, 9.5% cobinder, and 62% MEK solvent. The viscosity values are higher in Table III than Table II due to the higher solids content of the dispersion in Table III.

EXAMPLE 15

Preparation of 25 wt % HN6 Hyroxyl Polyurethane Copolymer

Into a 2 L reaction flask were charged 122.5 grams (0.041 equivalents) of HN6 macromonomer and 650 grams of methyl ethyl ketone. 100 grams of MEK was distilled off. 128.77 grams (1.03 equivalents) of MDI and 0.2 grams of dibutyltindilaurate were added and the reaction was held at reflux for 1 hour. Next, 25.2 grams (0.485 equivalents) of neopentyl glycol and 120.4 grams (0.283 equivalents) of Tone TM 0210 polycaprolactone diol were added and reflux was continued for 1 hour. 85.58 grams (0.475 equivalents) of Tone TM 0305 polycaprolactone triol and 128 grams of MEK were added and reflux was continued for 1 hour. The inherent viscosity was determined to be 0.237. A total of 8.5 grams (0.068 equivalents) of MDI was added to reach a final inherent viscosity of 0.272.

TABLE III

| Dispersion | ICI Dispersion Viscosity | Dispersion Smoothness |
|---|---|---|
| D | 31 | Good |
| E | 54 | Good |
| F | 59 | Good |
| SHPU (Control Ex. 13) | 51 | Good |

EXAMPLE 16

Dispersion G was prepared using the vinyl/SHPU copolymer prepared in accordance with Examples 5 except that the ratio of charges were 4.3% Mogul L carbon black, 47% binder, and 73% solvent (6/3/1) MEK/toluene/cyclohexanone. Dispersion H was prepared similar to Dispersion G except that the binder comprised a 50–50 wt-% mixture of SHPU prepared according to Control Example 15 and vinyl chloride/vinyl alcohol copolymer available from Union Carbide under the trade designation VAGH.

TABLE IV

| Dispersion | ICI Viscosity | Dispersion Smoothness | Binder Tg |
|---|---|---|---|
| G | 45 | Good | 60° C. |
| SHPU (Control Ex. 15) | 22 | Good | 18° C. |
| H - SHPU/VAGH | 195 | Poor | 52° C. |

The data contained in the above Table demonstrates that a smooth low viscosity dispersion is obtainable with the relatively high Tg binder used in dispersion G. Blending of SHPU with the commonly used VAGH polymer to obtain high Tg gave poor dispersion results.

Other embodiments of this invention will be apparent to those skilled in the art from a consideration of this specification or from the practice of the invention disclosed herein. Various omissions, modifications, and changes to the principles described herein may be made by one skilled in the art without departing from the true scope and spirit of the invention which is indicated by the following claims.

What is claimed is:

1. A dispersion for use in magnetic recording media comprising:
  (a) a copolymer comprising:
    (i) a polyurethane backbone;
    (ii) at least one $SO_3M$ group pendant from the polyurethane backbone, wherein the polyurethane backbone has an $SO_3M$ equivalent weight of from about 5,000 to about 30,000 and wherein M is selected from the group consisting of $H+$, $NR_4^+$ wherein R can be $H^+$ or an alkyl group, $Li^+$, $Na^+$, $K^+$ and mixtures thereof;

(iii) at least two crosslinkable hydroxy groups pendant from the polyurethane backbone, wherein the polyurethane backbone has a hydroxy equivalent weight of from about 1000 to about 5,000; and
(iv) at least one vinyl polymeric segment pendant from the polyurethane backbone; and
(b) a magnetizable pigment dispersed in said polymer.

2. A composite for magnetic recording comprising:
(a) a substrate having a front side and a back side;
(b) a cured dispersion coating on at least one side comprising a cured copolymer, the copolymer comprising:
(i) a polyurethane backbone;
(ii) at least one $SO_3M$ group pendant from the polyurethane backbone, wherein the polyurethane backbone has an $SO_3M$ equivalent weight of from about 5,000 to about 30,000 and wherein M is selected from the group consisting of $H^+$, $NR_4^+$ wherein R can be $H^+$ or an alkyl group, $Li^+$, $Na^+$, $K^+$, and mixtures thereof;
(iii) at least two crosslinkable hydroxy groups pendant from the polyurethane backbone, wherein the polyurethane backbone has a hydroxy equivalent weight of from about 1000 to about 5,000; and
(iv) at least one vinyl polymeric segment pendant from the polyurethane backbone; and
(c) a magnetizable pigment and optionally a nonmagnetizable pigment dispersed in said cured dispersion on at least one side.

3. A dispersion for use in magnetic recording media comprising:
(a) a graft copolymer comprising;
(i) a polyurethane backbone;
(ii) at least three crosslinkable hydroxy groups pendant from the polyurethane backbone, wherein the polyurethane backbone has a hydroxy equivalent weight of from about 500 to about 50,000; and
(iii) at least one vinyl polymeric segment comprising polymerized polymerizable monomer pendant from the polyurethane backbone;
(b) a dispersing agent; and
(c) a magnetizable pigment dispersed in said copolymer.

4. A composite for magnetic recording comprising:
(a) a substrate having a front side and a back side;
(b) a cured dispersion coating on at least one side comprising a graft copolymer comprising;
(i) a polurethane backbone;
(ii) at least three crosslinkable hydroxy groups pendant from the polyurethane backbone, wherein the polyurethane backbone has a hydroxy equivalent weight of from about 500 to about 50,000; and
(iii) at least one vinyl polymeric segment comprising polymerized polymerizable monomer pendant from the polyurethane backbone; a dispersing agent; a magnetizable pigment dispersed in said cured dispersion on at least one side.

5. A dispersion for use in magnetic recording media comprising:
(a) a block copolymer comprising:
(i) a polyurethane backbone;
(ii) at least three crosslinkable hydroxy groups pendant from the polyurethane backbone, wherein the polyurethane backbone has a hydroxy equivalent weight of from about 500 to about 50,000; and
(iii) at least one vinyl polymeric macromonomer segment pendant from the polyurethane backbone, wherein said vinyl polymeric macromonomer segment comrises residues of a macromonomer diol copolymerized into the polyurethane backbone, and further wherein the molecular weight of said segment is from about 1000 to about 20,000; and
(b) a magnetizable pigment dispersed in said block copolymer.

6. A composite for magnetic recording comprising:
(a) a substrate having a front side and a back side;
(b) a cured dispersion coating on at least one side comprising the cured block copolymer of claim 5; and
(c) a magnetizable pigment dispersed in said cured dispersion on at least one side.

* * * * *

UNITED STATES PATENT AND TRADEMARK OFFICE
CERTIFICATE OF CORRECTION

PATENT NO.: 5,244,739

DATED: September 14, 1993

INVENTOR(S): James G. Carlson et al.

It is certified that error appears in the above-identified patent and that said Letters Patent is hereby corrected as shown below:

Col. 14, line 61, "$(T_3)$" should be --$(T_०)$--.

Col. 16, line 64, "HA 6" should be --HA-6--.

Col. 16, line 66, "( 005" should be --(0.005--.

Col. 17, line 67, "(125" should be --(0.125--.

Signed and Sealed this

Seventh Day of May, 1996

Attest:

BRUCE LEHMAN

*Attesting Officer*   *Commissioner of Patents and Trademarks*